(12) United States Patent
Varone

(10) Patent No.: US 9,875,048 B2
(45) Date of Patent: *Jan. 23, 2018

(54) SOLID STATE MEMORY UNIT AND METHOD FOR PROTECTING A MEMORY INCLUDING VERIFICATION OF A SEQUENCE OF REQUESTS FOR ACCESS TO PHYSICAL BLOCKS

(71) Applicant: STMICROELECTRONICS S.R.L., Agrate Brianza (IT)

(72) Inventor: Francesco Varone, Hillsborough, NJ (US)

(73) Assignee: STMICROELECTRONICS S.R.L., Agrate Brianza (MI) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/361,825

(22) Filed: Nov. 28, 2016

(65) Prior Publication Data
US 2017/0075608 A1 Mar. 16, 2017

Related U.S. Application Data

(63) Continuation of application No. 13/532,024, filed on Jun. 25, 2012, now Pat. No. 9,529,983.

(30) Foreign Application Priority Data

Jun. 30, 2011 (IT) .............................. MI2011A1223

(51) Int. Cl.
*G06F 3/06* (2006.01)
*G06F 12/00* (2006.01)
(Continued)

(52) U.S. Cl.
CPC .......... *G06F 3/0622* (2013.01); *G06F 3/0659* (2013.01); *G06F 3/0679* (2013.01);
(Continued)

(58) Field of Classification Search
CPC ...... G06F 21/79; G06F 21/31; G06F 2220/61; G06F 3/0622; G06F 3/0659;
(Continued)

(56) References Cited

U.S. PATENT DOCUMENTS 6,134,657 A 10/2000 Johnson et al.
7,007,025 B1 2/2006 Nason et al.
(Continued)

FOREIGN PATENT DOCUMENTS

EP 2222081 8/2010

*Primary Examiner* — Tuan Thai
*Assistant Examiner* — Glenn Gossage
(74) *Attorney, Agent, or Firm* — Slater Matsil, LLP

(57) ABSTRACT

A microprocessor of a solid state memory protects the contents of the solid state memory by comparing a sequence of requests for access to physical blocks of the solid state memory with a predetermined sequence of requests to verify the sequence of requests, and by responding to additional requests for access to the physical blocks of the solid state memory to decrypt and transfer requested files stored therein when the sequence of requests equals the predetermined sequence of requests, thereby verifying the sequence of requests. The predetermined sequence of requests is associated with a plurality of virtual files that can be selected, in a particular sequence, to simulate a request for access to physical blocks of the solid state memory, while the predetermined sequence of requests is stored in a configuration file of the solid state memory in correspondence with an identifier of additional protected files.

18 Claims, 1 Drawing Sheet

(51) Int. Cl.
*G06F 21/31* (2013.01)
*G06F 21/79* (2013.01)
*H04L 9/06* (2006.01)

(52) U.S. Cl.
CPC ............ *G06F 21/31* (2013.01); *G06F 21/316* (2013.01); *G06F 21/79* (2013.01); *H04L 9/0618* (2013.01)

(58) Field of Classification Search
CPC ............ G06F 3/0679; G11B 20/00152; G11B 20/0021; G11B 20/00695; H04L 9/0618
See application file for complete search history.

(56) References Cited

U.S. PATENT DOCUMENTS

| | | |
|---|---|---|
| 7,418,602 B2 | 8/2008 | Yoshida et al. |
| 7,516,220 B1 | 4/2009 | Stiert |
| 7,992,202 B2 | 8/2011 | Won et al. |
| 2006/0004974 A1 | 1/2006 | Lin et al. |
| 2007/0030963 A1 | 2/2007 | Wyld et al. |
| 2007/0124201 A1 | 5/2007 | Hu et al. |
| 2009/0172810 A1 | 7/2009 | Won et al. |
| 2010/0095062 A1 | 4/2010 | Koraichi et al. |
| 2010/0125907 A1 | 5/2010 | Jonsson |
| 2010/0161927 A1 | 6/2010 | Sprouse et al. |
| 2010/0306152 A1 | 12/2010 | Altay et al. |
| 2011/0022850 A1 | 1/2011 | Lee et al. |
| 2011/0066818 A1 | 3/2011 | Yu et al. |
| 2011/0239272 A1 | 9/2011 | Stone |
| 2013/0007396 A1 | 1/2013 | Varone et al. |

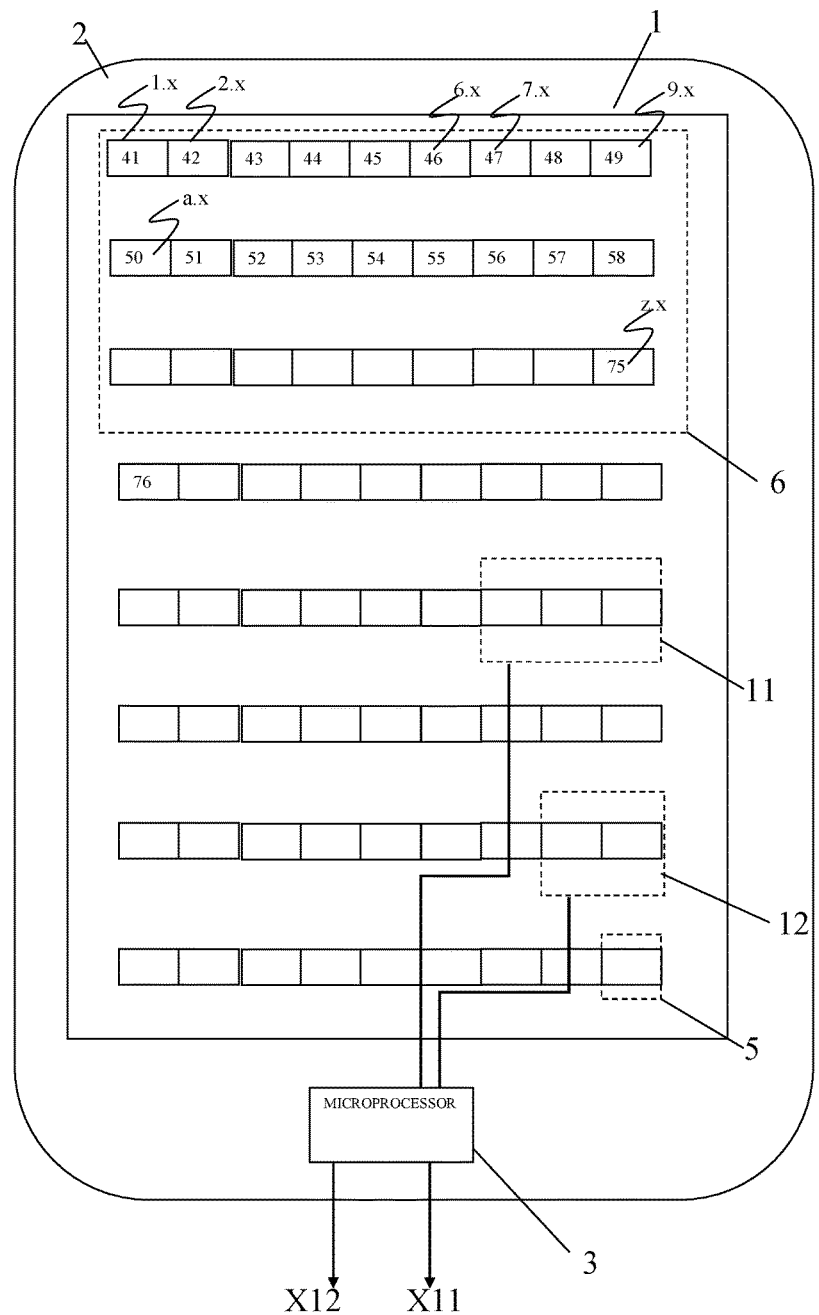

SOLID STATE MEMORY UNIT AND METHOD FOR PROTECTING A MEMORY INCLUDING VERIFICATION OF A SEQUENCE OF REQUESTS FOR ACCESS TO PHYSICAL BLOCKS

CROSS REFERENCE TO RELATED APPLICATIONS

This application is a continuation application of U.S. patent application Ser. No. 13/532,024 (now U.S. Pat. No. 9,529,983), which claims priority to IT Application No. MI2011A001223 filed Jun. 30, 2011, all of which are hereby incorporated herein in their entireties by reference.

FIELD OF THE INVENTION

The present invention relates to the field of solid state memories including a microprocessor; and in particular, to the protection of the content of the solid state memory, in case a relative access code is not provided.

BACKGROUND OF THE INVENTION

As it is known, a solid state memory, for example an Integrated Circuit (IC) Card, a Subscriber Identification Module (SIM) or a Universal Serial Bus (USB) memory, comprises a microprocessor and is suitable for storing digital contents that can be read by an external device, for example by a cell phone, by a multimedia reader or by a personal computer. In particular, it is possible to protect the digital contents of the memory via software of the device that is provided to set a protection password for the data and to enable their access only after a verification of the password. For example, the programs Winzip™ or Word™ allow protecting the digital contents with a password.

Similarly, it is known to protect the digital contents with a program of cryptography of the device that saves the data in memory in cryptographic format and allows their reading only via a de-cryptography key. However, it is not possible to access the digital contents when the memory is transferred to an external device devoid of the software of cryptography, also knowing the protection password or the cryptography key.

Moreover, some reading devices of the solid state memory have a limited input interface and do not allow the input of a protection password; for example, an mp3 reader is provided with a cursor for the selection of the music pieces, for their activation, interruption or end, but it is not provided with an alphanumeric keyboard for the insertion of a password.

Finally, even if the data is in the cryptographic format, the digital contents can be copied by the solid state memory to another storage or media, and attempts made to identify the de-cryptography key and reach the digital contents for free.

There is a need to protect a solid state memory that is integrated in the memory device, i.e. able to protect its digital content independently from the device reader connected thereto, such as independently from the software or from the interface that the device is provided with, and to prevent copying or reading of the digital contents in plain or cryptographic format.

SUMMARY OF THE INVENTION

The approach underlying the present invention is that of associating a protection password of a solid state memory with a predetermined sequence of requests for access to its contents, and of transferring the content requested by a reader device, only if preliminarily the microprocessor of the solid state memory has verified the occurrence of the predetermined sequence of requests. Advantageously, any device able to read the solid state memory, independently from the specific user interface it is supplied with, is able to select the predetermined sequence of contents and thus to indicate the protection password of the memory. For example, an mp3 device (e.g. an iPod™ device) provided only with a scrolling interface for the selection of the music pieces, and thus devoid of an alphanumeric keyboard, can be used for indicating a password for access to the solid state memory, i.e. by selecting the predetermined sequence of music pieces.

Moreover, no protection software may be needed in the reader device, since it is the microprocessor of the memory that executes a preliminary verification step of the sequence of the access requests, before transferring an actual content of the memory, if the sequence occurs. In case the microprocessor verifies that the sequence of access requests is wrong, a transmission of altered contents is provided, for example, of the data in a cryptographic or non-readable format, or a block of the solid state memory.

According to this approach, the technical problem is addressed by a method for protecting a solid state memory comprising a microprocessor, wherein the microprocessor controls requests for access to physical blocks of the memory and transfers one or more requested files from a requesting device only subsequent to a verification of a predetermined sequence of requests for access to the physical blocks. The predetermined sequence of requests corresponds to a predetermined sequence of requests for access to file(s) of the memory that can be selected by the device. For example the device is a cell phone and the solid state memory is a SIM; the device can be a digital camera or an iPod™ device and the memory a respective solid state drive (SSD) or a micro-Secure Digital (micro-SD). Advantageously, the device does not store any software for the protection of the contents of the memory and the predetermined sequence can be selected by any device suitable for reading the memory; moreover, the memory is protected independently from the device.

According to another aspect, the predetermined sequence of requests for access to physical blocks is controlled starting from the activation of the solid state memory, as a PIN for access to the memory. In this case, as long as the predetermined sequence does not occur, i.e. the user does not select the correct files of the memory, the access to all the contents of the memory is denied.

According to another aspect, the protection control is not executed at the activation or only at the turn-on and on the entire content of the memory, but is executed on single contents or on groupings of contents (for example folders) and during the use of the memory, possibly after having obtained an access to at least part of it. In this case, it is provided, for example, that a further predetermined sequence of requests for access to physical blocks is verified for enabling the access to further protected files of the memory. This further predetermined sequence may be stored in a configuration file of the solid state memory, in correspondence with an identifier of the further protected files. Advantageously, according to this aspect, the configuration file can be protected at the turn-on of the memory, i.e. by the PIN or by the password associated with the predetermined sequence of accesses, and it stores a plurality of PINs or protection passwords associated with specific contents of the memory. The user can overwrite the configuration file and modify the access rights or the passwords associated with each further protected file. Advantageously the configuration file can be protected so that it is never possible to read its content. According to this aspect, when the physical blocks associated with the configuration file are accessed, the microprocessor of the memory media gives back other data instead of the real content of the file.

In particular, if the predetermined sequence of requests for access or the further predetermined sequence of requests for access to physical blocks does not occur, the microprocessor transfers cryptographic data, in response to the request for files or for further protected files of the requesting device. In this way, the reading device of the solid state memory is not able to show the user the real content of the memory.

Several further embodiments can be implemented, according to this aspect. For example, it is possible that the data is in any case saved in cryptographic format on the solid state memory and that the microprocessor activates its de-cryptography only after a verification of the occurrence of the predetermined sequence of requests for access. It is also provided that the microprocessor stores the further protected file in cryptographic format and decrypts the cryptographic data after the verification of the further predetermined sequence of requests for access of the further protected file, for transmittal to the device, if the further predetermined sequence of requests for access occurs.

Otherwise it is provided that the cryptography is executed after the verification of the predetermined sequence of requests for access and on all the data of the memory, if the predetermined sequence of requests for access does not occur, or after the verification of the further predetermined sequence of requests for access and only on the further protected files, if the further predetermined sequence of requests for access does not occur.

According to another aspect, when the configuration file is written or overwritten, the files referenced by the above configuration file are ciphered according to the instructions and the keys contained therein.

According to an aspect, the blocks of the predetermined sequence or of the further predetermined sequence are associated with non-erasable files of the memory or with virtual files. The virtual files can be, for example, seen by the user as files that can be selected by the device and their request for access effectively simulates a request for access to the physical blocks of the memory that are involved in the determination of the correct sequence of requests for access. In particular, the virtual files are not present in the memory but simulated by the microprocessor.

The above technical problem is also addressed by a solid state memory media comprising a microprocessor including a controller of the requests for access to physical blocks of the memory. The controller is programmed for transferring an actual requested file from a requesting device only subsequent to a verification of a predetermined sequence of requests for access to the physical blocks, each physical block corresponding to a file that can be selected by the device. Advantageously, the memory incorporates the means or circuitry of verification of its access and is inherently protected, independently from the device associated therewith or from the software of the latter device.

BRIEF DESCRIPTION OF THE DRAWINGS

Further characteristics and advantages of the method and of the memory according to the present invention will be apparent from the following description made with reference to the annexed drawing and given by way of non limiting example within the scope of protection.

The FIGURE is a schematic diagram illustrating a solid state memory, according to the present invention.

DETAILED DESCRIPTION OF THE PREFERRED EMBODIMENTS

With reference to the FIGURE, a solid state memory 2 comprising a microprocessor 3 and a plurality of physical blocks of memory 41, 42, . . . , 76, . . . is schematically shown. Hereafter in the description, for indicating the memory 2, the term "memory unit" is also used, meaning that the memory 2 comprises also the microprocessor and a support media layer. For example, the memory may be a SIM card for a cell phone, suitable for storing a telephone number and the user's personal information, for example, a telephone index, messages, Short Message Service (SMS), Multimedia Messaging Service (MMS), pictures or documents. Without limiting the scope of protection, the memory can also be a Micro-SD for an iPod™ device or a Universal Serial Bus (USB) memory that can be interfaced with a personal computer.

Each physical block 41, 42, 43, . . . is identified by a respective numeric address, that can be used by a reading device for accessing the data of the memory. In particular, the input/output (I/O) circuitry of the memory manages the addresses of the physical blocks and the transfer of the data to the device, as well as the control of the errors (error checking) of addressing or of transfer. The physical blocks are associated with logic files or virtual files of the memory, i.e. with files that can be identified via a user interface of the device suitable for reading the memory.

Some specific physical blocks of the memory are involved in the identification of a code for accessing or unlocking of the content of the memory itself. In particular, the microprocessor 3 interprets a predetermined sequence of requests for access to physical blocks of the memory like a password for access to its content.

More specifically, the microprocessor 3 controls the requests for access to the physical blocks 41, 42, 43, . . . and allows the reading of the remaining content of the memory only after verification of the occurrence of the specific sequence of requests for access to physical blocks. In other words, if the device is connected to the memory for accessing the contents, the microprocessor prevents its access until the predetermined sequence 42, 47, 46, 50 of requests for access to physical blocks occurs.

This predetermined sequence corresponds to a predetermined sequence 2.x, 7.x, 6.x, a.x of requests for access to logic or virtual file(s) 1.x-9.x, a.x-z.x (shown as reference numeral 6 in the FIGURE) of the memory that can be selected by the device and can be seen by the user. For example, the method provides that a sequence of n requests for access to the files of a compilation are executed via the interface of an iPod™ device able to scroll the music files, in predetermined sequence, before the music files are effectively made accessible by the iPod™ device for reproduction. By way of example, the method provides that n files are selected by a solid state memory of the USB type, in predetermined sequence, via a mouse and a relative personal computer that displays, with a known application of exploration of the resources, the list of the files of the memory USB.

In all these cases it is the microprocessor of the solid state memory that determines the effective access to the content of the memory and interprets the request for access to the file associated with the sequence as a step of a procedure of authentication of the user. For the device, the selection of a file associated with the predetermined sequence or of a file not associated therewith, i.e. any other file requested by the user, occurs without any operative difference.

According to an aspect, it is provided that the files that can be selected by the user and associated with the physical blocks of the memory are generated by the memory itself as virtual files. For example, a solid state memory for the storage of sound files, can automatically generate the virtual files 1.MP3, 2.MP3 . . . 9.MP3 and/or A.MP3, B.MP3, . . . Z.MP3 etc. These files can be selected by an audio reader device, as normal sound files. The content of the virtual files does not necessarily conform to that of the other files but nothing prevents it, for example, virtual files with extension .MP3. Preferably, the insertion of the sequence of requests for access is executed by reproducing an alphanumeric and mnemonic PIN, corresponding to the concatenation of the filename of the files whose access is requested, in the predetermined sequence.

In an embodiment, the microprocessor does not allow access to the actual content of the stored files if the predetermined sequence 42, 47, 46, 50 of requests for access to the physical blocks does not occur. The sequence may be verified starting from the activation of the solid state memory, as a PIN for access to the memory. Advantageously, the PIN may not be stored in the memory but associated with the sequence of requests for access to the physical blocks.

Once the sequence is verified, all the content of the memory may be readable, through the device associated therewith. This first verification constitutes a first level of protection for the memory.

According to another aspect, if the sequence of the requests executed is correct, at least part of the content of the memory is further protected, thus supplying a second level of protection for the memory. In particular, a further protection of some files of the memory is provided. If the device requests the access to these files, indicated hereafter in the description as further protected files 12, the microprocessor 3 verifies a further predetermined sequence 44, 44, 48 of requests for access to physical blocks, this further sequence being stored in a configuration file 5 of the solid state memory. The configuration file comprises, for example, a table that associates a further predetermined sequence 44, 44, 48 with each identifier of the files 12.

According to another aspect, only part of the content of the memory is protected and the access to it is conditioned when a predetermined sequence 42, 47, 46, 50 or 44, 44, 48 of requests for access occurs. The remaining part of the memory can be accessed without the sequence occurring.

In case the predetermined sequence 42, 47, 46, 50 of requests for access or the further predetermined sequence 44, 44, 48 does not occur, several forms of protection of the content of the memory are provided including blocking access to the memory or in modifying its actual content. In an embodiment, it is, for example, provided that the microprocessor disables the I/O interface of the device.

In another embodiment, it is provided that the microprocessor transfers cryptographic data X11, X12, in response to the request of files 11 or of further protected files 12 by the requesting device. The cryptography can be executed subsequent to the verification of the predetermined sequence 42, 47, 46, 50 of requests for access and on all the data 1 of the memory, if the predetermined sequence 42, 47, 46, 50 of requests for access does not occur, or subsequent to the verification of the further predetermined sequence (44, 44, 48) of requests for access and only on the further protected files 12, if the further predetermined sequence 44, 44, 48 of requests for access does not occur.

According to another embodiment, the files transferred in plain format from the device to the memory, are saved in the memory in the cryptographic format and the configuration file comprises a de-cryptography key that is used by the microprocessor of the memory only subsequent to the verification of a correct sequence of requests for access to physical blocks of memory, for decrypting the file and returning them back in plain format to the requesting device.

According to another embodiment, when the configuration file is written or overwritten, the files of the user referenced by the above configuration file, whose content was previously stored in plain format, are subjected to ciphering according to the instructions and the keys contained in the configuration file. Preferably, the configuration file is in XML format.

Advantageously the configuration file can be protected so that it is never possible to read its content. According to this aspect, when the physical blocks associated with the configuration file are accessed, the microprocessor of the memory support gives back other data instead of the real content of the file.

According to the approach of the present embodiments, the technical problem is addressed also by a solid state memory unit comprising a memory and a microprocessor. The microprocessor of the memory comprises a controller of the requests for access to the physical blocks 41, 42, 43, . . . of the memory, and is programmed for transferring an actual file 11 of the memory, requested by a requesting device, only subsequent to a verification of a predetermined sequence 42, 47, 46, 50 of requests for access to physical blocks, each physical block corresponding to a file 1.x, 2.x, . . . , 9.x, a.x, b.x, . . . , z.x that can be selected by the device. This file 1.x, 2.x, . . . , 9.x, a.x, b.x, . . . , z.x can be a logic or virtual file.

Preferably, the name 1, 2, . . . , 9, a, b, . . . , z of the predetermined files 1.x, 2.x, . . . , 9.x, a.x, b.x, . . . , z.x corresponds to a respective numeric 1, 2, . . . , 9 or alphabetic a, b, . . . , z character and the predetermined files h.x, e.x, l.x, l.x, o.x corresponding to the sequence form a PIN, for example 'hello', of access to the memory. The predetermined files (1.x, 2.x, . . . , 9.x, a.x, b.x, . . . , z.x) are read only files, so that it is always possible to insert the PIN from the device.

According to a preferred embodiment, the controller, in the presence of the predetermined sequence of requests for access sends on the I/O interface of the memory the files h.x, e.x, l.x, l.x, o.x corresponding to the PIN 'hello', for giving back the file to the user as confirmation of access to the data. Preferably the files are of the audio type and, after the verification of the PIN, a sound file is reproduced.

According to an embodiment, the solid state memory comprises also a generator of multimedia data that are given back to the external device at the access of particular files, for example, the files h.x, e.x, l.x, l.x, o.x that constitute the PIN as confirmation of the introduction of the file.

The controller, in the absence of the predetermined sequence of requests for access, sends the data to the device in ciphered format, according to what is described in the above described method. In particular, it is provided that the data are stored in ciphered format in the memory and that the controller is programmed for sending the data in plain format to the device, only in the presence of the predetermined sequence of requests for access.

According to an embodiment, the generator of multimedia data generates data relative to a message for informing the user that it is necessary to specify a correct sequence or that the sequence already specified is not correct. The data relative to this message are given back to the device at the access of any file subjected to the protection.

The memory also comprises a configuration file (config.xml) that stores a list of files or data to be protected and corresponding sequences h.x, e.x, l.x, 1.x, o.x of files 1.x, 2.x, . . . , 9.x, a.x, b.x, . . . , z.x of the memory.

Hereafter some advantageous examples are described of the application of the method and of the card according to the present embodiments. The owner of the solid state memory can store a file of his or her own, of any format, for example, a picture, a document, a text, a voice registration, and prevent the access, simply on the basis of a predetermined sequence of requests for the contents of the memory. A supplier of solid state memories comprising music or video files, can ascertain that these contents are accessed only by the effective receiver, who can be supplied with the correct sequence of requests for access that serves as a PIN for the memory. A manufacturer of solid state memories can store some promotional contents and supply a buyer with the sequence of requests for access necessary for accessing the promotional contents. A record company can sell a compilation of pieces on a solid state memory and insert some promotional pieces belonging to another compilation, supplying the user in private and under specific contract conditions with the PIN to be used as a sequence of requests for access for listening to the promotional pieces.

This disclosure describes an intrinsic safety mechanism for the solid state memory, i.e. a mechanism that is installed on board the memory and autonomously able to protect its content. The protection of the data of the memory is independent from the software available on the device, and, thus, is active also when the device is devoid of programs for the insertion or the removal of passwords such as Winzip™, Word™ or of cryptography programs, such as Pretty Good Privacy (PGP). Moreover, the protection is also active when the solid state memory is removably transferred from one reading device to another. Finally, the insertion of the sequence of requests for access corresponding to the protection PIN of the solid state memory can be executed by any device able to communicate with the memory, also if this reader is devoid of an alphanumeric interface for the insertion of alphanumeric characters.

That which is claimed:

1. A method for protecting a solid state memory having a microprocessor, the method comprising:
   comparing a sequence of requests for access to physical blocks of the solid state memory with a predetermined sequence of requests to verify the sequence of requests, the physical blocks of the solid state memory corresponding to the predetermined sequence of requests being associated with a plurality of virtual files that can be selected to simulate a request for access to physical blocks of the solid state memory corresponding to the predetermined sequence of requests; and
   responding, via the microprocessor, to additional requests for access to the physical blocks of the solid state memory to decrypt and transfer requested files stored therein when the sequence of requests equals the predetermined sequence of requests, thereby verifying the sequence of requests;
   wherein the predetermined sequence of requests for access to physical blocks of the solid state memory are stored in a configuration file of the solid state memory in correspondence with an identifier of additional protected files.

2. The method according to claim 1 further comprising receiving the sequence of requests from an external device.

3. The method according to claim 1 wherein the sequence of requests is verified at activation of the solid state memory as a personal identification number (PIN) for accessing the solid state memory.

4. The method according to claim 1 wherein, if verification of the sequence of requests does not occur, the microprocessor transfers cryptographic data, in response to a request for files.

5. The method according to claim 4 wherein the cryptographic data is generated on all data of the solid state memory after verification of the sequence of requests does not occur.

6. The method according to claim 1 further comprising providing, via the microprocessor, data corresponding to an information message instead of content of selectable files when the sequence of requests does not equal the predetermined sequence of requests.

7. A method for operating a solid state memory comprising:
   comparing a sequence of requests for access to physical blocks of the solid state memory with a predetermined sequence of requests to verify the sequence of requests, the physical blocks of the solid state memory corresponding to the predetermined sequence of requests being associated with a plurality of virtual files, generated by the solid state memory, that can be selected to simulate a request for access to physical blocks of the solid state memory corresponding to the predetermined sequence of requests; and
   responding to additional requests for access to the physical blocks of the solid state memory to decrypt and transfer requested files stored therein when the sequence of requests equals the predetermined sequence of requests, thereby verifying the sequence of requests;
   wherein the predetermined sequence of requests for access to physical blocks of the solid state memory are stored in a configuration file of the solid state memory in correspondence with an identifier of additional protected files, and wherein the predetermined sequence of requests is executed by reproducing an alphanumeric and mnemonic sequence corresponding to a concatenation of filenames of one or more of the plurality of virtual files.

8. The method according to claim 7 further comprising receiving the sequence of requests from an external device.

9. The method according to claim 7 wherein the sequence of requests is verified at activation of the solid state memory as a personal identification number (PIN) for accessing the solid state memory.

10. The method according to claim 7 wherein, if verification of the sequence of requests does not occur, transferring cryptographic data, in response to a request for files.

11. The method according to claim 10 wherein the cryptographic data is generated on all data of the solid state memory after verification of the sequence of requests does not occur.

12. The method according to claim 7 further comprising providing data corresponding to an information message instead of content of selectable files when the sequence of requests does not equal the predetermined sequence of requests.

13. A solid state memory unit comprising:

a solid state memory comprising physical blocks; and a microprocessor associated with said solid state memory and configured to compare a sequence of requests for access to physical blocks of the solid state memory with a predetermined sequence of requests to verify the sequence of requests, physical blocks of the solid state memory corresponding to the predetermined sequence of requests being associated with a plurality of virtual files that can be selected to simulate a request for access to physical blocks of the solid state memory corresponding to the predetermined sequence of requests, and when the sequence of requests equals the predetermined sequence of requests, thereby verifying the sequence of requests, responding to additional requests for access to the physical blocks of the solid state memory to decrypt and transfer requested files stored therein, wherein the predetermined sequence of requests for access to physical blocks of the solid state memory are stored in a configuration file of the solid state memory in correspondence with an identifier of additional protected files.

14. The solid state memory unit according to claim 13 wherein said microprocessor is configured to receive the sequence of requests from an external device.

15. The solid state memory unit according to claim 13 wherein said microprocessor is configured to verify the sequence of requests at activation of the solid state memory as a personal identification number (PIN) of the solid state memory.

16. The solid state memory unit according to claim 13 wherein the microprocessor is configured to output data of a requested file in a ciphered format in the absence of verification of the sequence of requests.

17. The solid state memory unit according to claim 13 wherein the solid state memory is configured to store data in a ciphered format; and wherein the microprocessor is configured to output the data in plain format upon verification of the sequence of requests.

18. The solid state memory unit according to claim 13 wherein the solid state memory comprises a memory of a subscriber identification module (SIM) card.

* * * * *